(12) United States Patent
Bronstein et al.

(10) Patent No.: US 12,011,901 B2
(45) Date of Patent: Jun. 18, 2024

(54) GLAZING HAVING AREA FOR COLLECTION OF INFORMATION

(71) Applicant: ACR II GLASS AMERICA INC., Nashville, TN (US)

(72) Inventors: Wladislaw Bronstein, Konz (DE); Markus Walter Pohlen, Mückeln (DE)

(73) Assignee: ACR II GLASS AMERICA INC., Nashville, TN (US)

( * ) Notice: Subject to any disclaimer, the term of this patent is extended or adjusted under 35 U.S.C. 154(b) by 0 days.

(21) Appl. No.: 18/198,410

(22) Filed: May 17, 2023

(65) Prior Publication Data
US 2023/0373193 A1 Nov. 23, 2023

Related U.S. Application Data

(60) Provisional application No. 63/342,808, filed on May 17, 2022.

(51) Int. Cl.
*B32B 7/12* (2006.01)
*B32B 17/10* (2006.01)

(52) U.S. Cl.
CPC .. *B32B 17/10275* (2013.01); *B32B 17/10073* (2013.01); *B32B 17/10568* (2013.01); *B32B 2250/04* (2013.01); *B32B 2307/41* (2013.01); *B32B 2307/7376* (2023.05); *B32B 2605/00* (2013.01)

(58) Field of Classification Search
CPC ........ B32B 17/10275; B32B 17/10036; B32B 17/10761; B32B 17/10348
See application file for complete search history.

(56) References Cited

U.S. PATENT DOCUMENTS

2021/0237403 A1* 8/2021 Klein ................ B32B 17/10036

* cited by examiner

*Primary Examiner* — Elizabeth E Mulvaney
(74) *Attorney, Agent, or Firm* — K&L Gates LLP; Shu Chen

(57) ABSTRACT

A laminated glazing comprises a first glass sheet, a first interlayer, a second interlayer, and a second glass sheet. At least a portion of the second interlayer includes a first opaque print, and the first opaque print at least partially surrounds a window for collection of information. Optical distortion in the window for collection of information in the laminated glazing is closer to zero than an average optical distortion outside of the window for collection of information.

14 Claims, 1 Drawing Sheet

GLAZING HAVING AREA FOR COLLECTION OF INFORMATION

CROSS REFERENCE TO RELATED APPLICATIONS

The application claims priority to U.S. Provisional Patent Application No. 63/342,808, filed on May 17, 2022, entitled "GLAZING HAVING AREA FOR COLLECTION OF INFORMATION," the content of which is incorporated by reference herein in its entirety.

TECHNICAL FIELD

The present disclosure is generally related to a glazing having an area through which a sensor may collect information about a surrounding environment.

BACKGROUND

Information acquisition systems for autonomous driving function in vehicles, including cameras and other sensors are commonly mounted behind a glazing of a vehicle. They require a glazing with minimal optical distortion in an area through which an information acquisition system may collect data from a surrounding environment, or a window for collection of information. The camera area is typically surrounded by an opaque black print for straylight reduction. An opaque print on a glass sheet of the laminated glazing may cause optical distortion in an area around the opaque print. The opaque print is typically applied to the glass sheet prior to bending of the glass. During bending, there may be a local difference in heat absorption caused by the opaque print which may cause distortion in areas of the glass adjacent to the opaque print. To improve the quality of the glazing, including a reduction in the optical distortion, an opaque layer around a window for collection of information may be provided on an interlayer.

SUMMARY

In one aspect, the present disclosure generally relates to a laminated glazing, comprising: a first glass sheet; a first interlayer; a second interlayer; and a second glass sheet. At least a portion of the second interlayer may include a first opaque print, and the first opaque print may at least partially surround a window for collection of information. Optical distortion in the window for collection of information in the laminated glazing is closer to zero than an average optical distortion outside of the window for collection of information.

In some embodiments, the first interlayer and the second interlayer may be made of the same base material. The second interlayer may be positioned between the first interlayer and the first glass sheet. Thickness of the second interlayer may be from 20 μm to 50 μm.

In certain embodiments, the thicknesses of the first glass sheet and the second glass sheet may be from 1.0 mm to 2.5 mm. In yet another embodiment, the thicknesses of the first glass sheet and the second glass sheet are from 1.6 mm to 2.3 mm. In one aspect, the second interlayer may have at least one edge without the first opaque print. At least one edge of the second interlayer without the first opaque print may be aligned with an edge of the window for collection of information. In addition, at least one edge of the second interlayer without the first opaque print may be at or within 10 mm outside an edge of the window for collection of information.

In some embodiments, the laminated glazing may further comprise a second opaque print on at least one of the first glass sheet and the second glass sheet. In one aspect, the window for collection of information may be within 300 mm of a top edge of the laminated glazing when installed in a vehicle. The optical distortion in the window for collection of information in the laminated glazing may be measured as an average optical distortion across the window for collection of information. In another embodiment, the optical distortion in the window for collection of information in the laminated glazing may be measured as the absolute minimum optical distortion within the window for collection of information.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
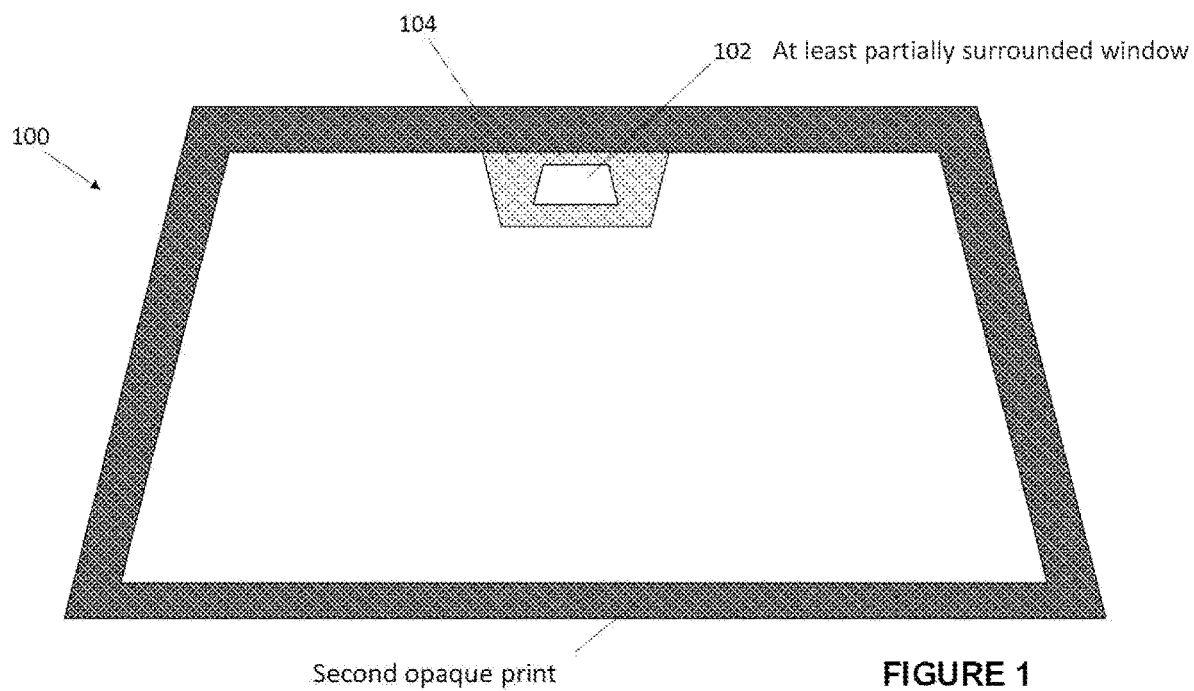
FIG. 1 illustrates a glazing, according to an embodiment of the present disclosure.

Various aspects of the present disclosure will be described with reference to the drawings, wherein like reference numerals are used to refer to like elements throughout. In the following description, for purposes of explanation, numerous specific details are set forth in order to promote a thorough understanding of one or more aspects of the present disclosure. It may be evident in some or all instances, however, that any aspects described below can be practiced without adopting the specific design details described below.

Figure 2:
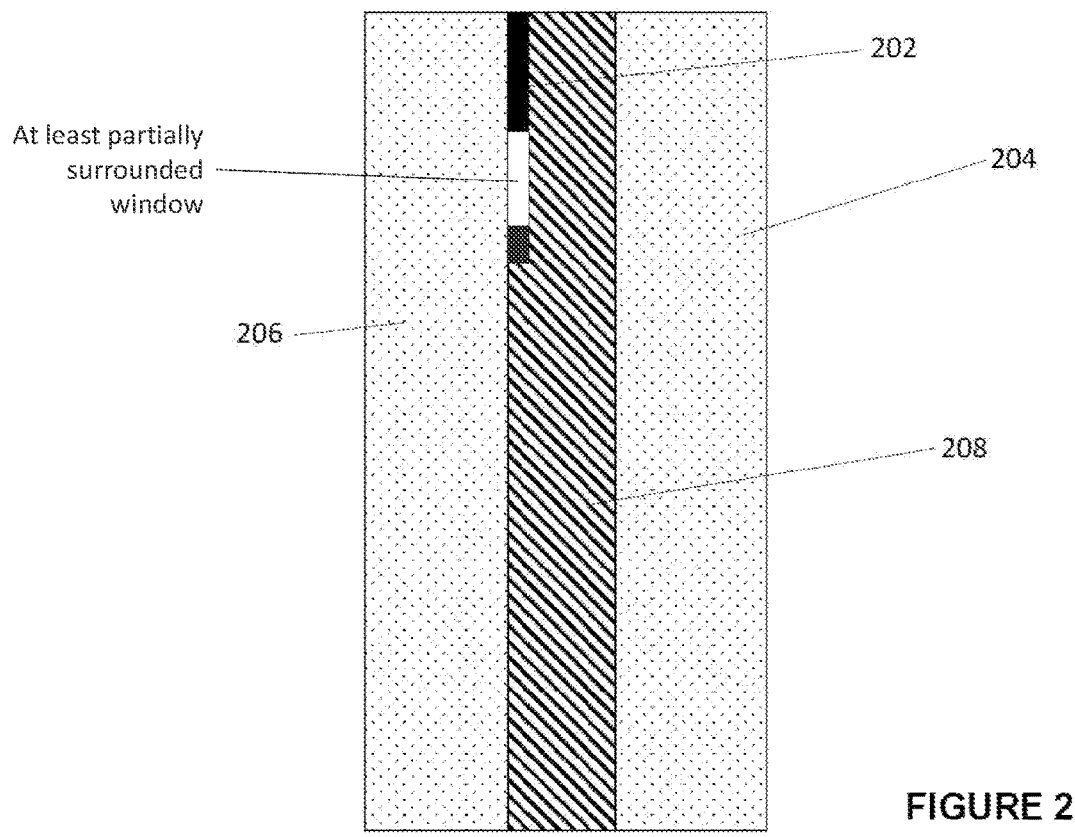
FIG. 2 illustrates a cross section of a glazing, according to an embodiment of the present disclosure.

In accordance with aspects of the present disclosure, as will be described fully with respect to FIGS. 1 and 2, an opaque print may be provided on an interlayer laminated between glass sheets of a vehicle glazing 100. In one aspect, the interlayer may include an opaque print designed to provide a frame at least substantially around the window for collection of information 102. The opaque print 104 may entire or partially surround the window for collection of information 102. In some embodiments, the second interlayer 202 may have at least one edge without an opaque print which may align with an edge of the window for collection of information 102 without an opaque print. At least one edge of the second interlayer 202 without an opaque print may be positioned at or within 10 mm outside an edge of the window for collection of information 102. The opaque print 104 may be applied to a side of the interlayer 202. In a laminated glazing, the printed interlayer may be laminated with another interlayer. The printed interlayer may be provided in a size smaller than the other interlayer. For example, as shown in FIG. 2, a laminated construction may particularly include a first glass sheet 204, a first full size interlayer 208, a second interlayer 202 with an opaque print, and a second glass sheet 206. The first and second interlayers 208, 202 may be the same base material, which may preferably be polyvinyl butyral. The second interlayer 202 may be laminated between the first interlayer 208 and the first glass sheet 204. In some embodiments, the second interlayer 202 may be laminated between the first interlayer 208 and the second glass sheet 206. The opaque print 104 on the second interlayer 202 may face the first interlayer 208 when laminated in the glazing.

During the glass bending process, some distortion may be introduced to glass sheets. Further, when multiple glass sheets are laminated together, they may have the same or different distortions from one another. The laminated glazing therefore may have distortion attributable to the glass sheets. Particularly, the glass sheets may have distortion along a top edge of the glass sheets. The top edge of the glass sheets may generally refer to the top edge of the glass sheets when a laminated glazing is installed in a vehicle. Such distortion may result from a bending process including a combination of sag bending and press bending. As shown in FIG. 1, in a laminated glazing having a window for collection of information 102, the window for collection of information 102 may preferably be in an area near the top edge of the laminated glazing 100. Preferably, the window for collection of information 102 may be within 200 mm to 300 mm of the top edge of the laminated glazing 100, such that a bottom edge of the window for collection of information 102 is within the 200 mm to 300 mm from the top edge of the laminated glazing 100. The window for collection of information 102 may be positioned so as to allow for a high placement of a camera or other sensor in the vehicle to minimize the disruption to a driver's view.

The second interlayer 202 with an opaque print 104 may preferably be thinner than the first interlayer 208. Preferably, the second interlayer 202 may be thin to avoid a large change in thickness in the glazing 100. Distortion may occur when there is a step-change in thickness in the interlayers between glass sheets. Such distortion, however, may be used to counteract some of the distortion caused by bending of the glass sheets. Distortion in the glass sheets may typically be a negative distortion and distortion caused by the addition of the second interlayer 202 may be a positive distortion in the area of the additional material of the second interlayer 202. Thus, it may be preferable that the second interlayer 202 include a non-printed area within the window for collection of information 102. The combination of the negative distortion and the positive distortion may provide a laminated glazing having a window for collection of information 102 with distortion closer to zero than the distortion in the laminated glazing 100 without the second interlayer 202.

In some embodiments, the second interlayer 202 may preferably have a thickness of from 20 μm to 50 μm. The thickness may determine how much distortion is compensated for by the second interlayer 202. For example, a second interlayer having a thickness of 50 μm may have distortion further from zero than a second interlayer having a thickness of 20 μm.

The glass sheet thickness may further determine the area of distortion compensation possible with the second interlayer 202. A relatively thicker glass sheet may be less flexible than a thinner glass sheet and may therefore result in a more gradual change in thickness at the edge of the second interlayer 202. The more gradual change in thickness may result in a larger area showing distortion due to the change in thickness. For example, in some embodiments, the first and second glass sheet 204, 206 may have a thickness of 1.0 mm to 2.5 mm, more preferably 1.6 mm to 2.3 mm. A laminated glazing having relatively thicker glass sheets may be able to compensate for distortion across a relatively larger window for collection of information 102.

In accordance with other aspects of the present disclosure, the laminated glazing 100 may further include an opaque print on one or both glass sheets 204, 206. The opaque print 104 on a glass sheet may include a border around the periphery of the glass sheet. The opaque print on the second interlayer 202 may overlap or meet the glass opaque print, so that there is no space between the opaque prints when viewed by an observer of the laminated glazing. The glass opaque print may include a black enamel print.

The second interlayer opaque print 104 may or may not extend to an edge of the second interlayer. The area of the opaque print 104 may be enough to mask an information acquisition system installed in a vehicle. A larger opaque print may not be desired where it may interfere with or limit the view of a vehicle driver and/or passenger.

Optical distortion may be measured as defined in ECE-R43 (Regulation No 43 of the Economic Commission for Europe of the United Nations (UN/ECE)—Uniform provisions concerning the approval of safety glazing materials and their installation on vehicles). Further, optical power may be measured by using ISRA Labscan-Screen 2D inspection equipment. Optical filter settings may be 3/2/0, corresponding to a physical length of 2 mm. Suitable masking filter settings may also be applied such as 6/5/5/R. The optical distortion of the window for collection of information 102 may include an average optical distortion across the window for collection of information 102. In some embodiments, the optical distortion of the window for collection of information 102 may be an absolute minimum, or the absolute value of the minimum, optical distortion in the window for collection of information 102.

In accordance with aspects of the present disclosure, the optical distortion of the window for collection of information 102 may be closer to zero than the distortion of the laminated glazing 100 in an area outside of the window for collection of information 102. For example, the optical distortion outside of the window for collection of information 102 may be measured as the average optical distortion. For example, the average optical distortion may be measured along a line 10 mm to 100 mm from the outer edge of the opaque print 104 on the second interlayer 202, at a distance from the top of the laminated glazing 100, which is equal to the distance from the top of the laminated glazing 100 to the middle point of the window for collection of information 102. In one embodiment, the distance from the top of the laminated glazing 100 may include the shortest distance from the top of the laminated glazing 100.

The above description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Further, the above description in connection with the drawings describes examples and does not represent the only examples that may be implemented or that are within the scope of the claims.

Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

Insofar as the description above and the accompanying drawings disclose any additional subject matter that is not within the scope of the narrow claims presented herein, the inventions are not dedicated to the public and the right to file one or more applications to claim such additional inventions is reserved. Further, although narrow claims are presented, it should be recognized that the scope of this (or these) inventions is much broader than presented by the current claims. It is intended that broader claims will be submitted in an application that claims the benefit of priority from this application upon conversion.

The invention claimed is:

1. A laminated glazing, comprising:
   a first glass sheet;
   a first interlayer;
   a second interlayer; and
   a second glass sheet;
   wherein at least a portion of the second interlayer includes a first opaque print, the first opaque print at least partially surrounds a window for collection of information of a vehicle,
   wherein optical distortion in the window for collection of information in the laminated glazing is closer to zero than an average optical distortion outside of the window for collection of information.

2. The laminated glazing according to claim 1, wherein the first interlayer and the second interlayer are the same base material.

3. The laminated glazing according to claim 1, wherein the second interlayer is positioned between the first interlayer and the first glass sheet.

4. The laminated glazing according to claim 1, wherein the thickness of the second interlayer is from 20 μm to 50 μm.

5. The laminated glazing according to claim 1, wherein the thicknesses of the first glass sheet and the second glass sheet are from 1.0 mm to 2.5 mm.

6. The laminated glazing according to claim 5, wherein the thicknesses of the first glass sheet and the second glass sheet are from 1.6 mm to 2.3 mm.

7. The laminated glazing according to claim 1, wherein the second interlayer has at least one edge without the first opaque print.

8. The laminated glazing according to claim 7, wherein at least one edge of the second interlayer without the first opaque print is aligned with an edge of the window for collection of information.

9. The laminated glazing according to claim 7, wherein at least one edge of the second interlayer without the first opaque print is at or within 10 mm outside an edge of the window for collection of information.

10. The laminated glazing according to claim 1, further comprising a second opaque print on at least one of the first glass sheet and the second glass sheet.

11. The laminated glazing according to claim 1, wherein the window for collection of information is within 300 mm of a top edge of the laminated glazing when installed in a vehicle.

12. The laminated glazing according to claim 1, wherein the optical distortion in the window for collection of information in the laminated glazing is measured as the average optical distortion across the window for collection of information.

13. The laminated glazing according to claim 1, wherein the optical distortion in the window for collection of information in the laminated glazing is measured as the absolute minimum optical distortion within the window for collection of information.

14. The laminated glazing according to claim 1, wherein a first optical distortion associated with at least one of the first and second glass sheets counteracts a second optical distortion due to an addition of at least the second interlayer between the first and second glass sheets.

\* \* \* \* \*